United States Patent
Addo

(10) Patent No.: US 10,095,220 B1
(45) Date of Patent: Oct. 9, 2018

(54) MODIFYING USER TOOLS TO INCLUDE CONTROL CODE FOR IMPLEMENTING A COMMON CONTROL LAYER

(71) Applicant: JPMorgan Chase Bank, N.A., New York, NY (US)

(72) Inventor: Nii Moi Addo, Hockessin, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 321 days.

(21) Appl. No.: 14/966,035

(22) Filed: Dec. 11, 2015

(51) Int. Cl.
*G05B 19/4155* (2006.01)

(52) U.S. Cl.
CPC .............. *G05B 19/4155* (2013.01); *G05B 2219/31418* (2013.01)

(58) Field of Classification Search
CPC .................. G05B 19/4155; G05B 2219/31418
See application file for complete search history.

(56) References Cited

U.S. PATENT DOCUMENTS

| | | | | |
|---|---|---|---|---|
| 8,875,087 B1* | 10/2014 | Li | ................... | G06F 17/5045 716/100 |
| 8,950,007 B1* | 2/2015 | Teal | ................... | G06F 21/554 726/30 |
| 2005/0086457 A1* | 4/2005 | Hohman | ................... | G06F 8/65 713/1 |
| 2007/0055943 A1* | 3/2007 | McCormack | ......... | G06F 3/0481 715/746 |
| 2007/0156659 A1* | 7/2007 | Lim | .................... | G06F 21/6227 |
| 2007/0156897 A1* | 7/2007 | Lim | ....................... | G06Q 10/10 709/225 |
| 2011/0265058 A1* | 10/2011 | Wang | ....................... | G06F 8/71 717/101 |
| 2015/0113626 A1* | 4/2015 | Bocanegra Alvarez | ..................... | H04L 63/0815 726/8 |
| 2015/0378717 A1* | 12/2015 | Jacob | ....................... | G06F 8/65 717/124 |

* cited by examiner

*Primary Examiner* — Morshed Mehedi
(74) *Attorney, Agent, or Firm* — LeClairRyan PLLC

(57) ABSTRACT

In certain embodiments, multiple user tools each comprise a script program implementing an operation for addition to a respective compiled software program deployed within a computing environment. A memory module stores control code for insertion into computer code of a particular user tool. The control code implements a common control layer, implementing control modules across the user tools. The control modules include access control for controlling access to the user tool, change control for controlling modification of the user tool, and version control for controlling use of an appropriate version of the user tool. A processor receives the particular user tool; to create a controlled particular user tool, automatically modifies, the computer code of the particular user tool to add the control code; and deploys the controlled particular user tool for use in the computing environment in a manner controlled by the control code of the controlled particular user tool.

18 Claims, 5 Drawing Sheets

MODIFYING USER TOOLS TO INCLUDE CONTROL CODE FOR IMPLEMENTING A COMMON CONTROL LAYER

TECHNICAL FIELD

This disclosure relates generally to computer systems and, more particularly, to modifying user tools to include control code for implementing a common control layer.

BACKGROUND

Business organizations and other entities typically provide users (e.g., employees) within the organization with an ability to use computer applications installed on or otherwise accessible via computer systems. These applications generally provide a set of functionality to the user. As just one example, a word processing computer application provides a set of functionality to users. Some users may desire to add functionality, controls, or other features to the computer applications, using a script program for example.

SUMMARY OF EXAMPLE EMBODIMENTS

According to embodiments of the present disclosure, disadvantages and problems associated with implementing user tools in an organization may be reduced or eliminated.

In certain embodiments, multiple user tools each comprise a script program implementing an operation for addition to a respective compiled software program deployed within a computing environment. A memory module stores control code for insertion into computer code of a particular user tool. The control code implements a common control layer, implementing control modules across the user tools. The control modules include access control for controlling access to the user tool, change control for controlling modification of the user tool, and version control for controlling use of an appropriate version of the user tool. A processor receives the particular user tool; to create a controlled particular user tool, automatically modifies, the computer code of the particular user tool to add the control code; and deploys the controlled particular user tool for use in the computing environment in a manner controlled by the control code of the controlled particular user tool.

Certain embodiments of the present disclosure may provide one or more technical advantages. In certain embodiments, this solution provides a consistent implementation of controls across the user tools of an organization. Certain embodiments centralize substantiation and testing of controls used for the user tools. Because the controls may be added to user tools in a consistent and centralized manner, certain embodiments reduce or eliminate a task of individually checking each user tool to manually confirm that appropriate controls are included in the user tool. Certain embodiments provide centralized auditing capabilities, possibly by logging activities of user tools and providing associate reporting, to audit the status of the user tools and compliance with the appropriate controls. Another technical advantage of certain embodiments is the provision of an automated solution that automatically introduces a common control layer across the user tools of an organization, and that automatically implements the controls provides by the common control layer. Certain embodiments are compatible with a variety of control approaches, including potentially shared folders.

Among other technical benefits, any combination of the above and other potential advantages may save the organization, and particularly the line of business associated with the user tool, time and costs in implementing appropriate controls for user tools. Furthermore, another technical advantage of certain embodiments is improving the operation of applications and devices users of the organization may use by improving compatibility and consistency of operation of implemented user tools with those applications and devices.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION OF EXAMPLE EMBODIMENTS

Figure 1:
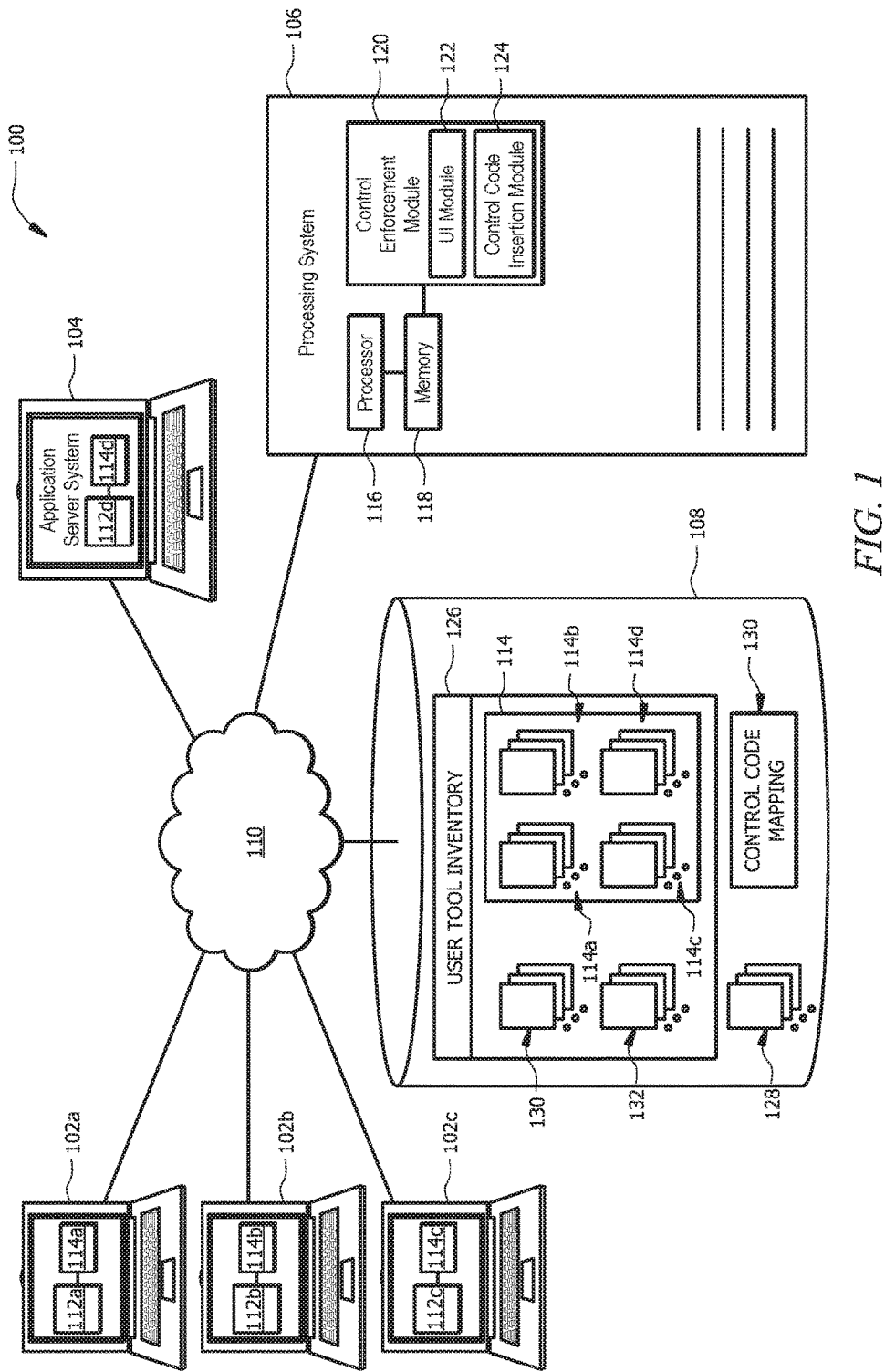
FIG. 1 illustrates a block diagram of an example system for modifying user tools to include control code for implementing a common control layer, according to certain embodiments of the present disclosure.

Users of computer applications (e.g., MICROSOFT OFFICE, MATLAB, SAS, QLIKVIEW (QV), and many others) deployed within an organization often desire to add functionality to or modify functionality of those computer applications. Users may do so by creating user tools that work with the computer applications. As one example, a user tool includes a script program that may add functionality to a computer application used by the user. Although user tools are primarily described as script programs, the present disclosure contemplates user tools including any computer code that adds functionality to or modifies functionality associated with a computer application. In some cases, the computer applications provide scripting languages that may be used to create user tools for use with the computer applications. Example scripting languages include visual basic for applications (VBA), M-Files, SAS scripts, QV scripts, and other languages.

The functionality added by a user tool may, for example, automate certain business processes the user frequently encounters in performing his or her job function. These user tools can be numerous, particularly in a large organization, where the user tools may scale with the workforce and business processes. Additionally, these user tools may become vital to certain business processes.

While potentially beneficial to the end user (and possibly other end users) and the organization, these user tools generally operate without appropriate information technology (IT) controls and can introduce hygiene concerns and become root causes to data confidentiality, integrity, entitlement, resiliency, and provenance breaches. For example, when the business function provided by the user tool is deliberately or accidentally altered, internal and external impacts to the organization can be costly. Furthermore, the technical, hourly, and financial costs of individually modifying these user tools to include appropriate controls to guard against the above and other risks can be burdensome to the organization.

Therefore, it may be advantageous to provide a system, method, and computer-readable medium for automatically modifying user tools to include control code for implementing a common control layer. Certain described embodiments introduce organizational controls within user tools with reduced or eliminated user intervention, conferring for example access, version, change, backup and resiliency controls. Embodiments of this disclosure receive via computer network a user tool, collocate within the user tool control code that implements a common control layer, and, as a result, confer a common control layer into the user tool and associated environment. Embodiments scale regardless of size of the organization.

In certain embodiments, multiple user tools each comprise a script program implementing an operation for addition to a respective compiled software program deployed within a computing environment. A memory module stores control code for insertion into computer code of a particular user tool. The control code implements a common control layer, implementing control modules across the user tools. The control modules include access control for controlling access to the user tool, change control for controlling modification of the user tool, and version control for controlling use of an appropriate version of the user tool. A processor receives the particular user tool; to create a controlled particular user tool, automatically modifies, the computer code of the particular user tool to add the control code; and deploys the controlled particular user tool for use in the computing environment in a manner controlled by the control code of the controlled particular user tool.

FIG. 1 illustrates a block diagram of an example system 100 for modifying user tools to include control code for implementing a common control layer, according to certain embodiments of the present disclosure. System 100 includes user computer systems 102, application server system 104, processing system 106, and storage module 108. User computer systems 102, application server system 104, processing system 106, and storage module 108 communicate over network 110.

In general, multiple user tools created by users of user computer systems 102 each comprise a script program implementing an operation for addition to a respective compiled software program (e.g., a computer application used by users of an organization) deployed within a computing environment. A memory module stores control code for insertion into computer code of a particular user tool. The control code implements a common control layer, implementing control modules across the user tools. The control modules may include any suitable combination of access control for controlling access to the user tool, change control for controlling modification of the user tool, version control for controlling use of an appropriate version of the user tool, and other suitable controls. Processing system 106 receives the particular user tool (e.g., via network 110); automatically modifies, to create a controlled particular user tool, the computer code of the particular user tool to add the control code; and deploys the controlled particular user tool for use in the computing environment in a manner controlled by the control code of the controlled particular user tool.

Each user computer system 102 includes any processing device that may be used by users within an organization. Although a particular number of computer systems 102 are illustrated, the present disclosure contemplates system 100 including any suitable number of computer systems 102. User computer systems 102 may store computer applications 112. In general, computer applications 112 include the software applications used by users of the organization to perform day-to-day functions (e.g., job functions). In certain embodiments, computer applications 112 are deployed or otherwise accessible to user computer systems 102 and provide a mechanism to extend and/or modify functionality through computer code invocation (e.g., programming). As just a few examples, computer applications may include MICROSOFT OFFICE (and its associated applications), MATLAB, SAS, QLIKVIEW, MATHEMATICA, JAVASCRIPT associated with a network (e.g., cloud, web, browser) experience, and any other suitable computer applications 112. Although a single application is illustrated on each computer system 102, the present disclosure contemplates computer systems 102 storing any suitable number of computer applications 112.

The term organization includes any entity that may use computer applications 112 and generate user tools for use with those computer applications. In certain embodiments, the organization is a business enterprise. As particular examples, the organization may include any business enterprise, such as a bank or bank holding company, an insurance company, a hedge fund, a real estate development companies, or other suitable business enterprise. These organizations are provided for example purposes only, as the present disclosure contemplates the organization being any suitable entity.

Users may include employees of the organization. For example, users may include users within different lines of business of the organization. In certain embodiments, a user of at least one of user computer systems 102 may include an IT specialist associated with the organization.

As described above, users may add functionality to or modify functionality of computer applications 112. To do so, users may create user tools 114. User tools 114 include computer code that adds functionality to or modifies functionality associated with a computer application 112. Certain user tools 114 may be written using an interpreted or compiled programming language. In certain embodiments, a user tool 114 is termed a script program. A script program may include a computer program or sequence of instructions (e.g., written in computer code) that is interpreted or carried out by another program (e.g., a computer application 112). User tools 114 (e.g., scripts) are written in computer code, using a particular computer programming language for example. In some cases, computer applications 112 provide scripting languages that may be used to create user tools 114 for use with the computer applications 112. Example scripting languages include VBA, M-Files, SAS scripts, QV scripts, and other languages. Although user tools 114 are primarily described as script programs, the present disclosure contemplates user tools 114 including any computer code that adds functionality to or modifies functionality associated with a computer application 112.

Although instances of user tools 114 that are used by users of user computer systems 102 are illustrated and primarily described as being stored on user computer systems 102, the present disclosure contemplates user tools 114 being stored at any suitable location, whether local or remote to user computer systems 102.

In addition to accessing computer application 112 stored on user computer systems 102, users of computer systems 102 may access over a network (e.g., network 108) applications 112 hosted on application server system 104. Applications 112 hosted on application server system 104 include applications hosted at a data center, web sites, or any other suitable types of applications 112 that are accessed over a network (e.g., network 110). Users of computer systems 102 may also generate user tools 114 associated with computer applications 112 hosted on application server system 104. In the illustrated example, user tool 114d is associated with computer application 112d (hosted by application server system 104), and is stored with application 112d on application server system 104. The present disclosure, however, contemplates a user tool 114 for a computer application 112 hosted on application server system 104 being stored at user computer systems 102 or at any other suitable location.

Using computer systems 102, users of computer systems 102 submit user tools 114 for modification to include control code for implementing a common control layer, resulting in controlled versions of the user tools 114. For example, users of computer systems 102 submit user tools 114 to processing system 106 for modification to include control code for implementing a common control layer. In certain embodiments, users of computer systems 102 access a user interface provided by processing system 106 to submit user tools 114 to processing system 106 for modification to include control code for implementing a common control layer.

Processing system 106 provides various operations associated with modifying user tools 114 to include control code that implements a common control layer, resulting in controlled versions of user tools 114. Processing system 106 may include a network server, any suitable remote server, a mainframe, a host computer, a workstation, a web server, a personal computer, a file server, or any other suitable processing device operable to communicate with other components of system 100. In some embodiments, processing system 106 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of processing system 106 may be performed by any suitable combination of one or more servers or other components at one or more locations. In an embodiment where processing system 106 is a server, the server may be a private server, or the server may be a virtual or physical server. The server may include one or more servers at the same or remote locations. Also, processing system 106 may include any suitable component that functions as a server.

In the illustrated example, processing system 106 includes a processor 116, a memory 118, and a control enforcement module 120.

Processor 116 communicatively couples to memory 118, and controls the operation and administration of processing system 106 and control enforcement module 120. Processor 116 includes any hardware and/or software that operates to control and process information. Processor 116 may be a programmable logic device, a microcontroller, a microprocessor, any suitable processing device, or any suitable combination of the preceding. Processing system 106 may include any suitable number of processors 116.

Memory 118 stores, either permanently or temporarily, data, operational software, or other information for access and/or execution by processor 116. Memory 118 includes any one or a combination of volatile or non-volatile local or remote devices suitable for storing information. For example, memory 118 may include RAM, ROM, magnetic storage devices, optical storage devices, or any other suitable information storage device or a combination of these devices. Processing system 106 may include any suitable number of memories 118.

Control enforcement module 120 provides various operations associated with modifying user tools 114 to include control code for implementing a common control layer, resulting in controlled versions of user tools 114. Control enforcement module 120 may be implemented using any suitable combination of hardware, firmware, and software. In the illustrated example, control enforcement module 120 includes user interface module 122 and control code insertion module 124. User interface module 122 and control code insertion module 124 may be implemented using any suitable combination of hardware, firmware, and software.

User interface module 122 generates a user interface for access by users of computer systems 102 and other suitable users to access control enforcement module 120. User interface module 122 may present users a series of screens that allow users to submit information to and receive information from control enforcement module 120. For example, users of computer systems 102 may use the user interface generated by user interface module 122 to submit user tools 114 for modification to include control code for implementing a common control layer, resulting in controlled versions of the user tools 114. As another example, users of computer systems 102 may use the user interface generated by user interface module 122 to access information associated with user tools 114.

Control enforcement module 120 is configured to modify user tools 114 to include control code for implementing a common control layer, resulting in controlled versions of the user tools. User tools 114 may be included on essentially any processing device that users associated with the organization may use, and control enforcement module 120 may be configured to discover these user tools 114. For example, user tools 114 may be stored on user computer systems 102 or at other suitable locations. As particular examples, user tools 114 may be stored on individual desktops or other workstations, mobile devices network drives, and network servers.

Control enforcement module 120 may discover in any suitable manner user tools 114 for modification to include control code for implementing a common control layer. In certain embodiments, users of user computer systems 102 access a user interface generated by user interface module 122 to submit user tools 114 for modification to include control code for implementing a common control layer. Additionally or alternatively, control enforcement module 120 may use a network crawler or other tool that automatically searches computer networks used by the organization (e.g., network 110) to discover user tools 114 implemented throughout the organization, and to identify and prompt registration (e.g., submission of the user tools to control enforcement module 120 for modification to include the control code that implements the common control layer) of discovered user tools 114 existing throughout the organization. For example, the network crawler or other tool may search user computer systems 102, application server systems 104, and any other suitable locations for user tools 114. Additionally or alternatively, the file system used by user computer systems 102 and application server system 104, or otherwise used by the organization, may be configured to identify user tools 114. Additionally or alternatively, the operating systems used by the organization may be modified to identify user tools 114. Additionally or alternatively, hardware of system 100 (e.g., network hardware, such as any suitable combination of routers, firewalls, and relays) may be configured to discover and route user tools 114 to processing system 106 (e.g., control enforcement module 120 for modification to include control code for implementing a common control layer.

The common control layer may include a set of controls, such as operational objectives, that are desired to be common to user tools 114 implemented throughout the organization. For example, the common control layer may provide a consistent, configurable set of requirements and operations with which user tools 114 are to comply and enforcement of those standards. The control code added to user tools 114 may implement the common control layer with minimal or no effects on the existing functionality provided by the user tools. In certain embodiments, the common control layer implements, across user tools 114 of the organization, inventory control, risk classification control, access control, version control, change control, document control, backup and resiliency control, data analytics control, user tool integrity control, and user tool policy and procedure management control. These example types of controls are described in greater detail below with reference to FIG. 2.

Control insertion module 124 of control enforcement module 120 may implement the common control layer by adding control code to user tools 114. In certain embodiments, the common control layer provided by the control code implements one or more control modules. As described in greater detail below, the control modules may include one or more of the following: an inventory control module, a risk classification control module, an access control module, a version control module, a change control module, a document control module, a backup and resiliency control module, a data analytics control module, a user tool integrity control module, and a user tool policy and procedure management control module.

Control enforcement module 120 may work with the control code added to a user tool 114 to implement the common control layer for the user tool 114. For example, control enforcement module 120 may communicate with control modules (described below) of the control code added to the user tool 114 to implement the common control layer for the user tool 114. In certain embodiments, control enforcement module 120 may itself provide certain operations of the common control layer.

Storage module 108 stores user tool inventory 126, control code 128, and control code mapping 130. Storage module 108 may include any one or a combination of volatile or non-volatile local or remote devices suitable for storing information. For example, storage module 108 may include random access memory (RAM), read only memory (ROM), magnetic storage devices, optical storage devices, or any other suitable information storage device or a combination of these devices. Storage module 108 may be part of or distinct from other components of system 100, such as user computer systems 102, application server system 104, and/or processing system 106. Although storage module 108 is illustrated and described as storing particular information, a portion or all of that information may be stored in memory 118 or another suitable location. System 100 may include any suitable number of storage modules 108 and the data stored by storage module 108 may be distributed across multiple storage modules 108.

In certain embodiments, computer systems 102, application server system 104, and processing system 106 (e.g., control enforcement module 120) access storage module 108 to add data to storage module 108, collect data from storage module 108, make use of data stored on storage module 108, and delete data from storage module 108. For example, processing system 106 (e.g., control enforcement module 120) may query storage module 108 to add data to storage module 108, collect data from storage module 108, make use of data stored on storage module 108, and delete data from storage module 108.

User tool inventory 126 generally provides an inventory of user tools 114 that are registered with control enforcement module 120. As described above, a user tool 114 that is registered with control enforcement module 120 may include a user tool 114 that control enforcement module 120 (e.g., using control code insertion module 124) has modified to include control code 128 that implements the common control layer, resulting in a controlled version of the user tool 114, or a user tool 114 that has been submitted to control enforcement module 120 for addition of the control code 128. User tool inventory 126 may also store an identification of user tools 114 that have been discovered by control enforcement module 120 but that have not been registered by control enforcement module 120, if appropriate.

In the illustrated example, user tool inventory 126 includes user tool profiles 130, user tool documents 132, and user tools 114. Although user tool inventory 126 is described as including certain information, the present disclosure contemplates user tool inventory 126 including any suitable information regarding user tools 114, according to particular needs.

User tool profiles 130 may include, for each user tool 114 identified in user tool inventory 126, an identification of the user tool 114, an owner of the user tool 114, a line of business associated with the user tool 114, and any other suitable information regarding the user tool 114.

User tool documents 132 include, for each user tool 114, documents associated with the user tool 114. The documents may include design documents for the user tool 114, policies and procedures associated with the user tool 114, and any other suitable documents associated with the user tool 114.

User tool inventory 126 also may include instances of user tools 114. For example, user tool inventory 126 may include a copy of each user tool 114. In other words, user tool inventory 126 may provide a centralized repository of each user tool 114 registered with control enforcement module 120 or for which registration is pending. The copies of a user tool 114 may include the original, non-controlled version of the user tool 114 (i.e., the version of user tool 114 that has not been modified to include control code 128 for implementing the common control layer); the controlled version of the user tool 114 (i.e., the version of user tool 114 that has been modified to include control code 128 for implementing the common control layer), and any suitable versions of the user tool 114 (e.g., updated versions of the user tool 114). Regarding the versions of the user tool 114, a user tool 114 may be modified over time, to implement additional functionality in the user tool 114 or to modify existing functionality of the user tool 114 for example. In certain embodiments, once a user tool 114 has been modified to include control code 128, each subsequent version of the user tool 114 is also a controlled version of the user tool 114 (i.e., the subsequent version of the user tool 114 also includes control code 128). User tool inventory 126 may include each of these versions of the user tool 114.

Control code 128 includes the computer code for implementing the common control layer across user tools 114. Control code insertion module 124 may access control code 128 to insert the control code 128 into user tools 114 that are discovered by control enforcement module 120. As described above, the common control layer provided by the control code implements one or more control modules. As described in greater detail below, the control modules may include one or more of the following: an inventory control module, a risk classification control module, an access control module, a version control module, a change control module, a document control module, a backup and resiliency control module, a data analytics control module, a user tool integrity control module, and a user tool policy and procedure management control module.

Control code 128 may be implemented using any suitable computer programming language. As particular example programming languages, control code 128 may be implemented using VBA, M Files, SAS scripts, QV scripts, and other languages. These computer programming language are provided for example purposes only, as the present disclosure contemplates control code 128 being implemented using any suitable computer programming language.

In certain embodiments, storage module 108 may store multiple instances of control code 128. Each instance of control code 128 may correspond to a particular programming language, such that control code 128 can seamlessly be added to a user tool 114 written in a particular programming language.

Control code mapping 130 provides a mapping of instances of control code 128 to particular programming languages. As described above, storage module 108 may store multiple instances of control code 128, each instance corresponding to a particular programming language. Control code insertion module 124 may access control code mapping 130 to determine the appropriate control code 128 to add to a particular user tool 114.

Control enforcement module 120 (e.g., via control code insertion module 124) may deploy a controlled version of a user tool 114 once control code 128 has been added to the user tool 114. Control enforcement module 120 may deploy the controlled version of the user tool 114 in any suitable manner. In certain embodiments, control enforcement module 120 may deny deployment of the controlled version of the user tool 114 until certain requests have been fulfilled by an owner of the user tool 114 or another suitable entity. For example, control enforcement module 120 may request that the owner or another suitable entity provide certain documents and approvals before the controlled version of the user tool 114 is deployed.

User computer systems 102 may be implemented using any suitable type of processing system and may include any suitable combination of hardware, firmware, and software. User computer systems 102 may each include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 100. User computer systems 102 may be a stand-alone computer or may be part of a larger network of computers associated with an entity.

User computer systems 102 may each include user display, which may include any suitable device operable to visually present information to a user. The user display may present graphical user interfaces ("GUIs"), each of which may comprise a visual interface operable to allow a user to interface with application server system 104, processing system 106, and storage module 108. Generally, the GUI provides the user with an efficient and user-friendly presentation of data provided by system 100. The GUI may comprise a plurality of displays having interactive fields, pull-down lists, and buttons operated by the user. The GUI, for example, may present a user with suitable displays for requesting modification of a user tool 114 to include control code for implementing a control layer. The GUI, for example, may present a user with suitable displays requesting modification of a user tool 114 to include control code for implementing a control layer. Further, the GUI may be any graphical user interfaces, such as generic web browsers, that process information in system 100 and efficiently presents the information to the user. User systems 102 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

User computer systems 102 may include input devices. The input devices, for example, may allow a user to interact with system 100 to request modification of a user tool 114 to include control code for implementing a common control layer. An input device, for example, may allow a user to interact with application server system 104, processing system 106, and storage module 108. An input device may comprise any user interface, such as a display, keyboard, mouse, or other appropriate terminal equipment.

Processing system 106 may be implemented using any suitable type of processing system and may include any suitable combination of hardware, firmware, and software. Processing system 106 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, smart phones, table computers, one or more servers, a server pool, one or more processors within these or other devices, or any other suitable processing device capable of receiving, processing, storing, and/or communicating information with other components of system 100. Processing system 106 may be a stand-alone computer or may be part of a larger network of computers associated with an entity.

Network 110 facilitates any suitable combination of wireless and wireline communication. Network 110 may communicate, for example, IP packets, Frame Relay frames, Asynchronous Transfer Mode (ATM) cells, voice, video, data, and other suitable information between network addresses. Network 80 may include one or more local area networks (LANs), radio access networks (RANs), metropolitan area networks (MANs), wide area networks (WANs), mobile networks (e.g., using WiMax (802.16), WiFi (802.11), 3G, 4G, LTE, or any other suitable wireless technologies in any suitable combination), all or a portion of the global computer network known as the Internet, and/or any other communication system or systems at one or more locations, any of which may be any suitable combination of wireless and wireline.

In operation of an example embodiment of system 100, control enforcement module 120 receives, via a communication network (e.g., network 110) a user tool 114. The user tool 114 may be submitted to control enforcement module 114 by a user of a user computer system 102. For example, the user may submit the user tool 114 via a user interface generated by user interface module 122 of control enforcement module. Alternatively, control enforcement module 120 may use a network crawler to discover the user tool 114. The present disclosure contemplates control enforcement module 120 discovering user tools 114 in any suitable manner.

Control enforcement module 120 determines whether the received user tool 114 is a controlled user tool. In certain embodiments, a controlled user tool includes a user tool 114 that has been modified to include control code 128, such that the common control layer is implemented for the user tool 114. A controlled user tool may be considered to be registered with control enforcement module 120. In certain embodiments, a non-controlled user tool includes a user tool 114 that has not been modified to include control code 128. To determine whether the received user tool 114 is a controlled user tool, control enforcement module 120 may access user tool inventory 126 stored on storage module 108 to determine whether a controlled version of user tool 114 exists.

If control enforcement module 120 determines that the received user tool 114 is a controlled user tool, then control enforcement module 120 performs a requested action for the received user tool 114. For example, the user that submitted the user tool 114 may request that an action be performed on the user tool 114. As one particular example, the action may include storing an updated version of the user tool 114.

If control enforcement module 120 determines that the received user tool 114 is not a controlled user tool (i.e., the user tool 114 is a non-controlled user tool 114), then control code insertion module 124 of control enforcement module 120 determines an appropriate instance of control code 128 with which to modify the user tool 114 to generate a controlled user tool for the received user tool 114. In certain embodiments, to determine an appropriate instance of control code 128 with which to modify the user tool 114, control code insertion module 124 accesses control code mapping 130 stored on storage module 108. As described above, control code mapping 130 provides a mapping of instances of control code 128 to particular programming languages. Control code insertion module 124 may analyze the received user tool 114 to determine the programming language of the user tool 114, and may search control code mapping 130 to determine an appropriate control code 128 for modifying the computer code of the user tool 114 to create a controlled user tool for the user tool 114.

Control code insertion module 124 determines whether an appropriate control code 128 for modification of the received user tool 114 was identified. If control code insertion module 124 determines that an appropriate control code 128 for modification of the received user tool 114 was not identified, then control code enforcement module 120 communicates a notification. The notification may indicate that no control code 128 for modifying the received user tool 114 to create a controlled user tool for the received user tool 114 was found. The notification may be sent to any suitable combination of the user who submitted the user tool 114 (if applicable), an appropriate IT professional, a line-of-business manager for the line of business associated with the user tool 114, or any other suitable destinations. The notification may prompt the IT professional to initiate creation of control code 128 that is compatible with the received user tool 114. Once a version of control code 128 that is compatible with the received user tool 114 has been created and added to storage module 108, control code insertion module 124 may then proceed as described below.

If control code insertion module 124 determines that an appropriate control code 128 for modification of the received user tool 114 was identified, then control code insertion module 124 automatically modifies, to create a controlled user tool for the received user tool 114, the computer code of the user tool 114 to add the control code 128 to the computer code of the user tool 114. As described above, the control code 128 implements a common control layer, which may provide a number of control modules across user tools 114 of the organization. In certain embodiments, the control modules of control code 128 include one or more of an inventory control module, a risk classification control module, an access control module, a version control module, a change control module, a document control module, a backup and resiliency control module, a data analytics control module, a user tool integrity control module, and a user tool policy and procedure management control module.

In embodiments in which the user tool 114 is a script program, automatically modifying, to create the controlled user tool for the user tool 114, the computer code of the user tool 114 to add the control code 128 to the computer code of the user tool 114 may be performed by adding the control code 128 to the script program of the user tool 114. In certain embodiments, control code insertion module 124 adds the control code 128 to the user tool 114 (whether a script program or other type of user tool) such that, when the user tool 114 is launched for use (e.g., by a user of a user computer system 102), the control code 128 executes before the primary operations of the user tool 114.

Control enforcement module 120 may request additional information regarding the received user tool 114. For example, control enforcement module 120 may submit request for information to various individuals associated with the received user tool 114. The individuals may include, for example, the user who submitted the user tool 114, a line-of-business manager for the line of business associated with the user tool 114, and any other suitable individuals. The request for information may include a request for documents associated with the user tool 114, a request for appropriate authorizations associated with the user tool 114, a request to complete a user tool profile 130 for the user tool 114, and any other suitable information.

Control enforcement module 120 determines whether the requested additional information has been received. If control enforcement module 120 determines that the requested additional information has not been received, then control enforcement engine may deny deployment of the controlled user tool generated for the received user tool 114. Additionally or alternatively, the received user tool 114 (and associated controlled user tool) may remain in a pending state until the requested information is received. In this scenario, upon receipt of the requested information, control enforcement module 120 may proceed as described below. If control enforcement module 120 determines that the requested additional information has been received, then control enforcement engine 120 stores information associated with the user tool 114. For example, control enforcement engine 120 may store a copy of the non-controlled user tool 114, a copy of controlled user tool for the user tool 114, information suitable for completing a user tool profile 130 for the user tool 14 (and controlled user tool for the user tool 114), a copy of some or all of the information received in response to the information request, and any other suitable information.

Control code insertion module 124 may deploy the controlled user tool for the user tool 114 for use in the computing environment in a manner controlled by the control code 128 of the controlled user tool for the user tool 114. Control code insertion module 124 may deploy the controlled user tool for the user tool 114 in any suitable manner. For example, control code insertion module 124 may push a copy of the controlled user tool to user computer systems 102 associated with appropriate users. As another example, control code insertion module 124 may communicate to appropriate users a link to a location from which the controlled user tool for the user tool 114 can be downloaded.

Although system 100 is illustrated and described as having particular components and a particular configuration, the present disclosure contemplates system 100 being implemented in any suitable manner, according to particular needs. Additionally, although particular components are described as performing particular operations, the present disclosure contemplates other components of system 100 or other components performing those operations. Modifications, additions, or omissions may be made to system 100 without departing from the scope of the disclosure. For example, system 100 may include any number of user computer systems 102, application server systems 104, processing system 106, and storage modules 108. Any suitable logic may perform the functions of system 100 and the components within system 100. Additionally, although memory 118 and storage module 108, as well as their associated data, are illustrated and described separately, the present disclosure contemplates these components and their associated contents being combined or separated in any suitable manner, according to particular needs.

Figure 2:
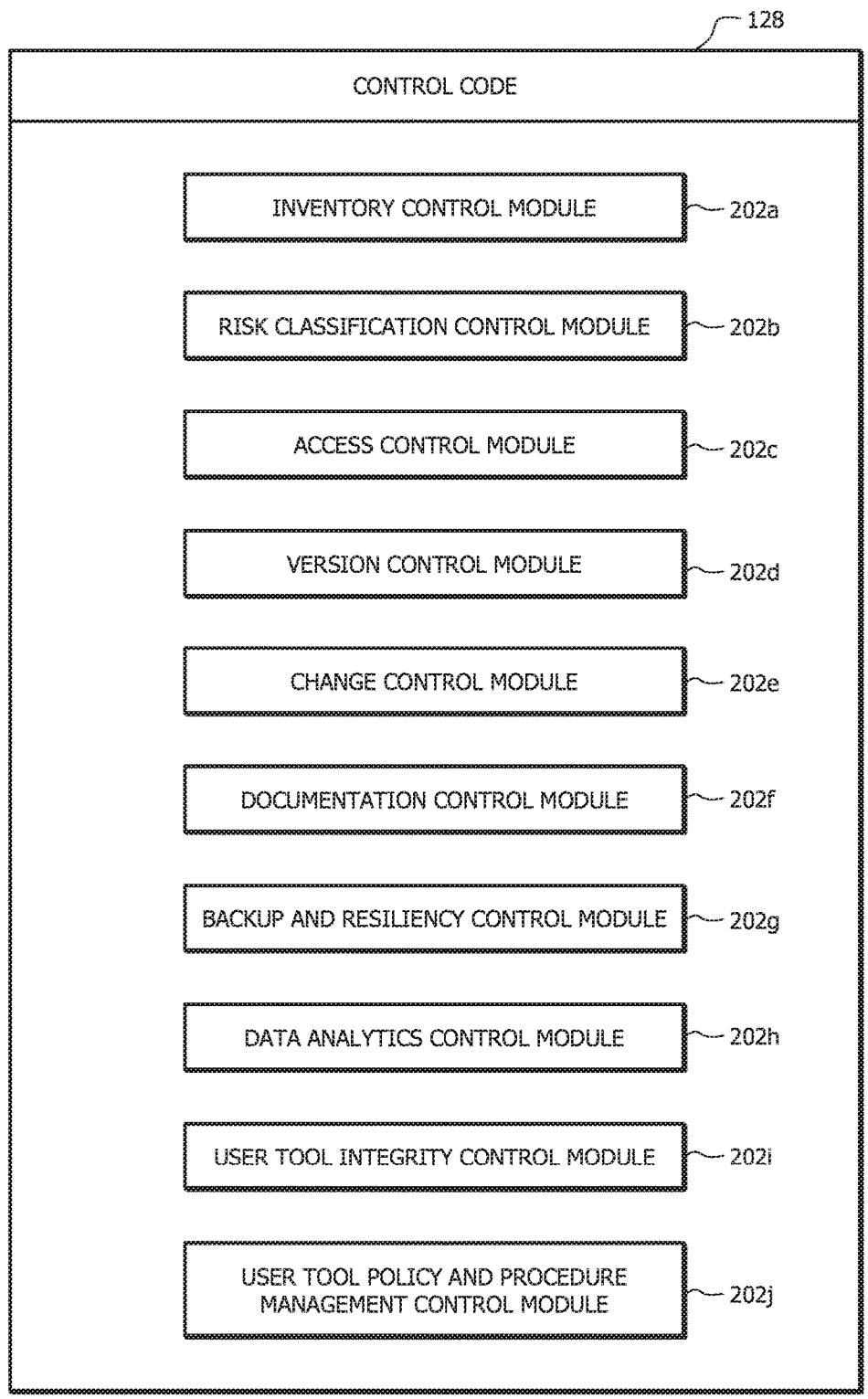
FIG. 2 illustrates example details of the control code, according to certain embodiments of the present disclosure.

FIG. 2 illustrates example details of control code 128 according to certain embodiments of the present disclosure. Control code 128 includes multiple control modules 202, which are used to implement the common control layer in user tools 114. In the illustrated example, control code 128 includes the following control modules 202: inventory control module 202a, risk classification control module 202b, access control module 202c, version control module 202d, change control module 202e, document control module 202f, backup and resiliency control module 202g, data analytics control module 202h, user tool integrity control module 202i, and user tool policy and procedure management control module 202j.

A portion or all of these control modules 202 may be included in control code 128 added to user tools 114 by control enforcement module 120. In certain embodiments, some of the control modules 202 may be provided by control enforcement module 120 but not included in the control code 128 added to user tools 114 by control enforcement module 120. Additionally or alternatively, portions or all of certain control modules 202 may be implemented in both control code 128 and control enforcement module 120. Control modules 202 may work alone, with each other, and/or with control enforcement module 120 to effect the common control layer.

FIG. 2 illustrates just one example implementation of control code 128. The present disclosure contemplates control code 128 being implemented in any suitable manner. Additionally, although control code 128 is illustrated and described as including particular control modules 202 implementing certain control operations, the present disclosure contemplates control code 128 including some, none, or all of the illustrated control modules 202, as well as including other control modules performing suitable operations. Each of the example control modules 202 illustrated in FIG. 2 is described below.

Inventory Control Module 202a

Inventory control module 202a provides an inventory of user tools 114 implemented in an organization. For example, inventory control module 202a may provide a way for the organization identify and track user tools 114 distributed throughout the computer network of the organization. In certain embodiments, suitable sub-groups within the organization (e.g., lines of business) may be responsible for identifying their associated user tools 114 and registering those user tools 114. Additionally or alternatively, the organization may use a network crawler or other tool that automatically searches computer networks (e.g., network 110) used by the organization to discover user tools 114 implemented throughout the organization, and to identify and prompt registration of discovered user tools 114 implemented throughout the organization to the extent the discovered user tools 114 are not already identified in and registered with the control enforcement module 120.

Information regarding the inventory of user tools 114 may be stored as user tool inventory 126 in storage module 108. For each user tool 114, inventory control module 202a may store information regarding the ownership and location of the user tool 114. Old and new user tools 114 may be registered and identified using inventor control module 202. In certain embodiments, a suitable individual or group within the organization may review and attest to the completeness of the inventory. For example, each line of business may review user tools 114 associated with the line of business and attest to the completeness of the user tools 114 tracked in inventory for the line of business. Line of business user tool inventory management procedures may be documented.

Risk Classification Control Module 202b

Risk classification control module 202b provides a mechanism for maintaining a risk classification of each user tool 114. In certain embodiments, each user tool 114 is rated according to user tool risk classification guidelines for the organization or subgroups (e.g., lines of business) within the organization.

In certain embodiments, a suitable individual or group within the organization may review and attest to the completeness of the risk classification of its associated user tools 114. For example, each line of business may review user tools 114 associated with the line of business and attest to the accuracy of the risk classification of the user tools 114 for the line of business. Line of business risk classification procedures may be documented. The review and verification of the risk classification of user tools 114 may be performed at suitable intervals to ensure verification on an ongoing basis. The timing and frequency of the reviews may be defined by the line of business for the user tool 114 and/or according to procedures associated with the function(s) provided by the user tool 114. In certain embodiments, a third-party tool may assist in the review and verification process.

Access Control Module 202c

Access control module 202c provides a mechanism for controlling access to user tools 114. Access to certain user tools 114 may be restricted to appropriate users. Access to user tools 114 can be controlled in any suitable manner. For example, access to user tools 114 may be role based such that, to access a particular user tool 114, the user has a role corresponding to roles authorized to access that user tool 114. In certain embodiments, a regular recertification process may be implemented. The recertification process may include an appropriate authority within the organization (e.g., a manager of the line of business associated with the user tool 114) verifying that appropriate access controls 114 are implemented for a user tool 114, a user being recertified for access to the user tool 114, or any other suitable recertification for implementing access control to user tools 114. If appropriate, password access to user tools 114, whether to use or to modify the user tools 114, may be implemented.

Control enforcement module 120 may store access control lists for the registered user tools 114 (e.g., controlled user tools). The authorization lists may identify users authorized to launch and use user tools 114, as well as users authorized to modify user tools 114. Providing access control may prevent access to and tampering with user tools 114, which may help ensure integrity of the computer code of user tools 114. In certain embodiments, access control module 202c extends the identity-based access control list with relevant private metadata to permit access based on any suitable combination of email address, distribution group membership, line of business, cost center, phone number, geographical fence (country, town, zip code, building, floor, seat), and other suitable factors.

In certain embodiments, access control module 202c implements runtime bindings, such as by any suitable combination of host, IP address, home folder, application inventory, and any other suitable factors, to limit or grant access to the user tool 114. Access control module 202c may provide access control partitions within a user tool 114, which may allow further entitlement granulation within the user tool 114 such that specific content or functional domains are accessible through identity and extended identity entitlement definitions.

In certain embodiments, access to user tools 114 is restricted to appropriate users through shared drive/folder restrictions. Access control module 202c may provide a folder locking capability to restrict access to user tools to appropriate users through shared drive/folder restrictions. Access control module 202c may implement runtime authorization checks to restrict access at a security identifier (SID) level. In certain embodiments, access control module 202c implements authorization internal to the user tool 114, which may allow access control to be enforced on copies of the user tool 114.

An approval workflow process for authorizing users to access user tools 114 may be implemented. Access administration procedures may be documented. Access may be removed when no longer appropriate. In certain embodiments, requests to access user tools 114 are recorded and authorized. In certain embodiments, an appropriate person within the organization (e.g., a manager of a line of business associated with the user tool 114 or owner of the user tool 114) may provide the authorization. Access to drives/folders where user tools 114 are stored may be logged and recertified, if desired.

In operation of an example embodiment, a user signs in to the host operating system (e.g., of an associated user computer system 102). The user may attempt to launch a user tool 114. Access control module 202c of the user tool 114 may facilitate determining whether the user is authorized to use the user tool 114. If access control module 202c of the user tool 114 determines that the user is authorized to use the user tool 114, then access control module 202c of user tool 114 facilitates permitting the user to access and use the user tool 114, consistent with the rights (and any associated limitations) associated with the user's access authorization. If access control module 202c of the user tool 114 determines that the user is not authorized to use the user tool 114, then access control module 202c of user tool 114 facilitates denying the user access to and use of the user tool 114. For example, access control module 202c may cause an "access denied" notice to be presented to the user attempting to access the user tool 114.

Version Control Module 202d

Version control module 202d provides a mechanism for controlling use of an appropriate version of a user tool 114. As described above, multiple versions of a user tool 114 may be stored in storage module 114. Version control module 202d may log versions of a user tool 114 and, if appropriate, ensure that the correct version of the user tool 114 is used. Version control module 202d may monitor the source location of new versions of the user tool 114 and automatically log new versions of the user tool 114.

Version control module 202d may assign a digital fingerprint to each instance of a user tool 114 across the organization (e.g., across network 110 used by the organization). Certain embodiments of version control module 202d provide developer group creation and management of versions of a user tool 114, which may allow developers to publish and maintain multiple versions of the user tool 114. For example, version control module 202d may connect users and developers along various stages (e.g., requirements review, design, build, test, and deploy) of the life cycle of a user tool 114. In certain embodiments, version control module 202d integrates with email and instant messaging (or other communication mechanisms) platforms to detect transmission of the user tool 114 such that a new version of the user tool 114 is created and tracked throughout the correspondence chain of the detected version of the user tool 114.

In certain embodiments, version control module 202d may save versions of a user tool 114 (e.g., in storage module 108) using a prescribed naming convention for folders. A new version of a user tool 114 may be created when changes are made to the user tool 114. Version control module 202d may tag versions of a user tool 114 with a version number and date when a new version of the user tool 114 is provided to control enforcement module 120. The version number of the user tool 114 may be displayed when a user launches the user tool 114. In certain embodiments, a new version of the user tool 114 is generated at the start of a new period (e.g., monthly or quarterly). Version control module 202d and/or control enforcement module 120 may generate customized notifications if a new version of a user tool 114 is not detected at the start of a new time period.

Version control module 202d may automatically store prior versions of the user tool 114 using control enforcement module 120 (e.g., in storage module 108). The prior versions of a user tool 114 may be accessible on demand through an application interface. Archived versions of the user tool 114 may retain the archival date/time stamp and follow the same file naming conventions as the current version of the user tool 114. Version control module 202d may facilitate maintenance of a version history for the user tool 114.

In certain embodiments, version control module 202d restricts operation of a user tool 114 to a designated version (e.g., a "golden" version), and achieves runtime versioning through backup frequency designation, such that a new version, golden or otherwise, is instanced when a backup of user tool 114 is provided. Version control module 202*d* may prevent access to and tampering of the user tool 114 and/or the control code 128 of the user tool 114, and may facilitate code integrity with developer-only access to a password for modifying the computer code of the user tool 114 and/or control code 128 of the user tool 114.

In operation of an example embodiment, a user launches an instance of a user tool 114. Version control module 202*d* determines whether a newer version of the user tool 114 is available. If version control module 202*d* determines that a newer version of the user tool 114 is available, then version control module 202*d* may notify the user that a newer version of the user tool 114 is available. The user may download (or otherwise obtain) a copy of the user tool 114 corresponding to the newer version and then proceed to use the newer version of the user tool 114.

Change Control Module 202*e*

Change control module 202*e* may provide a mechanism for controlling modification of a user tool 114. For example, change control module 202*e* may enforce reassessment and testing of new versions of the user tool 114 that introduce significant changes to the user tool 114. A description of what constitutes a significant change to a user tool 114 may be maintained. For example, each line of business may maintain a description of what constitutes a significant change for user tools 114 associated with that line of business. Change control module 202*e* may maintain audit trails of the reassessment and testing for user tools 114.

In certain embodiments, control enforcement module 120 automatically monitors computer networks used by the organization (e.g., network 110) for changes to user tools 114. Change control module 202*e* may log or otherwise document significant changes made to a user tool 114, potentially including a description and evidence of the changes made to the user tool 114. Significant changes made to the user tool 114 may be reflected in a user tool profile 130 for the user tool 114 maintained by control enforcement module 120 (e.g., in storage module 108).

Control enforcement module 120 and/or change control module 202*e* may provide customizable workflows for change approvals by management along with various reports to track compliance with/progress of approvals. Change control procedures may be documented. In certain embodiments, significant changes to user tools 114 are approved by management or another suitable individual or group. For example, a suitable person (e.g., a manager of a line of business associated with the user tool 114) within the organization reviews and approves changes to user tools 114. The person may tag the user tool 114 with an approval using the user interface generated by user interface module 122 of control enforcement module 120. During the approval process, the person may use the description for the user tool 120 (e.g., stored in user tool profile 130) entered by the developer to review changes to the user tool 114.

In certain embodiments, control enforcement module 120 and/or the change control module 202*e* provide a variety of audit trail capabilities, including any changes to data in cells, formula changes, reference changes, database (e.g., MICROSOFT ACCESS database) structure changes, worksheet level changes, macro changes, and or other suitable changes implicated by changes to a user tool 114. Change control module 202*e* may maintain access control and centralization of user tool 114 usage logs, including authorization attempts, entry and exit into files, and user tool 114 attribute changes. Change control module 202*e* may record user interactions in a reportable manner to display user tool activity including, for example, who, what, where, when, and how the user tool 114 changed and was used.

Change control module 202*e* may calculate and report differences between versions of a user tool 114. In certain embodiments, a file comparison tool may be used to determine differences between versions of the user tool 114. Change control module 202*e* may estimate the complexity of differences between selected versions of the user tool 114 and may rank the change significance as low, medium, or high (or according to any other suitable rankings). Change control module 202*e* may facilitate workflows based on the change significance estimate, including workflows which send alerts to internal and external parties such as auditors, regulators, control assessors, and/or others. In certain embodiments, change control module 202*e* prevents changes to a user tool 114 based on any suitable combination of the risk ranking designation of the user tool 114 and the complexity delta estimate of the attempted change to the user tool 114.

In certain embodiments, change control module 202*e* provides tamper resistance to the user tool 114 through self-validation of the integrity of the logic and content of the user tool 114 and its environment, including, for example, application runtime, host operating system, and physical hardware from which the user tool 114 is launched.

In operation of an example embodiment, a user requests a change (e.g., an enhancement) to a user tool 114. The user may cause a new version of the user tool 114 to be produced. Change control module 202*e* may facilitate generation of a notification to the user notifying the user that an approval hierarchy for the requested change to the user tool 114 is or is not fulfilled. The user may produce a report of changes made to the user tool 114.

Documentation Control Module 202*f*

Documentation control module 202*f* provides a mechanism for storing documentation associated with a user tool 114. The documents stored by document control module 202*f* may include documents explaining the user tool 114 (e.g., the purpose and functional requirements of the user tool 114), documents explaining the roles and responsibilities associated with the user tool 114 (e.g., including addressing key person risks), documents explaining compliance processes for the user tool 114 (e.g., explaining procedures for the various controls implemented by control code 128, such as inventory control, risk classification control, access control, version control, change control, document control, backup and resiliency control, data analytics control, user tool integrity control, and user tool policy and procedure management control).

The process to maintain documents associated with a user tool 114 may be established by the line of business associated with the user tool 114. In addition to the owner of the user tool 114, a backup user tool owner may be defined in the documentation. The backup user tool owner generally is familiar with the operation of the user tool 114.

In certain embodiments, accounts used for logging on to production applications and databases are documented, including details of their purpose. Data input areas and key calculations and business logic (e.g., formulas, macros, and computer code) may be documented for the user tool 114. Assumptions, units of measure, and reference data for the user tool 114 may be identified and documented. Documents may also identify outputs of a user tool 114. As described above, various change control procedures may be documented. For example, a definition of "significant changes" for purposes of change control may be defined by a suitable entity, such as the line of business associated with the user tool 114. In certain embodiments, control enforcement module 120 and/or documentation control module 202f facilitate display of a user interface (e.g., generated by user interface module 122) through which users can upload documents or provide other information stored for a user tool 114.

Backup and Resiliency Control Module 202g

Backup and resiliency control module 202g provides a mechanism controlling backups of data associated with a user tool 114. For example, backup and resiliency control module 202g may provide a mechanism to back up, retain, and delete user tools 114 and associated data. Backup and resiliency control module 202g may provide the ability to automatically back up the user tool 114 (e.g., the computer code and associated data of the user tool 114) at a defined frequency. In certain embodiments, backup and resiliency control module 202g provides end-user initiated on-demand backup. The backup, retention, and deletion of user tools 114 and associated data that are enforced using backup and resiliency control module 202g may be governed by one or more requirements, which may be established by the organization and defined in documents for the user tool 114. An appropriate user may have the ability, using control enforcement module 120 and/or backup and resiliency control module 202g, to designate backup frequency, to back up on demand, or to exempt a user tool 114 from backup. In some situations, certain of these requirements may be governed by one or more government laws or regulations.

By providing a mechanism (and possible enforcement of) backups, backup and resiliency control module 202g may shield against data loss in disaster recovery scenarios by assuring a relatively (if not the most) current copy of an instance of the user tool 114 is available and operable. In certain embodiments, backup and resiliency control module 202g provides automated purging of expired user tools 114 according to policies made at line of business, desk, team, building, and other levels. In certain embodiments, backup and resiliency control module 202g provides remote management, modification, and self-destruction of the user tools 114 across the organization network (e.g., network 110). User tools 114 may be stored on computer infrastructure that is regularly backed up. For example, a particular organization may determine that local drives are not to be used to store user tools 114; however, other organizations may not enforce such a restriction. In certain embodiments, backup and resiliency control module 202g provides audio, video, and text based forensic reconstruction of usage of user tools 114 through stored snapshots of the user tool 114 and a change control report of the user tool 114.

As described above, documentation regarding the backup processes and procedures may be provided and stored. For example, appropriate entities within the organization may agree on a backup and restoration policy, and that policy may be documented and stored (e.g., in storage module 108). Certain organizations may specify that backup and restoration procedures comply with larger organization-wide backup and retention policies. The ability to successfully recover user tools from backup media may be confirmed periodically.

In operation of an example embodiment, a user launches a user tool 114. Backup and resiliency control module 202g may determine whether a backup is due. If backup and resiliency control module 202g determines that a backup is not due, then backup and resiliency control module 202g may forgo prompting the user that a backup is due. If backup and resiliency control module 202g determines that a backup is due, then backup and resiliency control module 202g may prompt the user that a backup for the launched user tool 114 is due. In response to receiving an indication that a backup is due, a user of the user tool 114 may initiate the backup. Alternatively, backup and resiliency control module 202g may automatically initiate the backup and notify the user that the backup is being performed. In some instances, the user in this scenario is an owner of the user tool 114. Backup and resiliency control module 202g may display for the user a progress indicator of the transmission of a copy of the user tool 114 through the network (e.g., network 110) to a storage module (e.g., storage module 108).

Data Analytics Control Module 202h

Data analytics control module 202h provides analysis of use by end users of a user tool 114. For example, data analytics control module 202h may provide for big data analytics associated with a user tool 114. Big data analytics may include the collecting, organizing, and analyzing large quantities of data to discover patterns and other information. Certain embodiments provide the ability to run multiple coding languages (e.g., VBA, C++, C#, JAVA, and PYTHON) within user tools 114 towards data mining, business process improvement and complexity reduction, perimeter security protection, error checking and root cause detection, and other organizational objectives. Data analytics control module 202h may capture metadata associated with a user tool 114 including, for example, table and environment runtime definitions and content.

Data analytics control module 202h may correlate metadata for the user tool 114 to the schema of the organization data warehouse to establish source and destination linkages. Data analytics control module 202h may forecast accidental and deliberate data integrity breaches based on employee profiles, usage patterns, risk ranking, economic climate, natural environmental climate, and other factors.

Data analytics control module 202h may recommend automated analytic routines based on the frequency with which the offered routines are applied against similar data sets, users, environment variables, and other entities. Data analytics control module 202h may recommend user tools 114 within other user tools 114 and controlled organizational applications based on usage pattern estimations. Data analytics control module 202h may recommend replacement and retirement targets for a user tool 114 based on usage pattern estimates. In certain embodiments, data analytics control module 202h recommends user tools 114 when career events occur. These career events may include, for example, employee hires, transfers, and departures. Data analytics control module 202h may provision dynamically derived routines and elastic content models to remove manual development of a user tool 114 based on calculated usage and relevance estimates.

In operation of an example embodiment, a user launches a user tool 114. The user may perform day-to-day activities using the user tool 114. As a result of using the user tool 114, the user produces usage and content signals associated with using the user tool 114, which may be captured and analyzed by the data analytics control module 202h of the control code 128 of the user tool 114.

User Tool Integrity Control Module 202i

User tool integrity control module 202i provides an independent review of inputs, calculations, and outputs to verify completeness, accuracy, and fit for purpose. For example, a person other than the owner of a user tool 114 may perform a review of the user tool documentation, including for example, user tool logic and calculations. This review and verification may be performed at suitable intervals to ensure verification on an ongoing basis. The timing and frequency of the reviews may be defined by the line of business for the user tool 114 and/or according to procedures associated with the function(s) provided by the user tool 114. In certain embodiments, a third-party tool may assist in the review and verification process.

User Tool Policy and Procedure Management Control Module 202*j*

User tool policy and procedure management control module 202*j* may provide a mechanism for each line of business document, which may specify policies and procedures to a user tool 114, to be approved by a suitable individual (e.g., a control officer) associated with the organization. This review and approval process may ensure that policies and procedures associated with the controls for a user tool 114 (e.g., inventory control, risk classification control, access control, version control, change control, document control, backup and resiliency control, data analytics control, user tool integrity control, and user tool policy and procedure management control) are consistent with organizational objectives.

Figure 3:
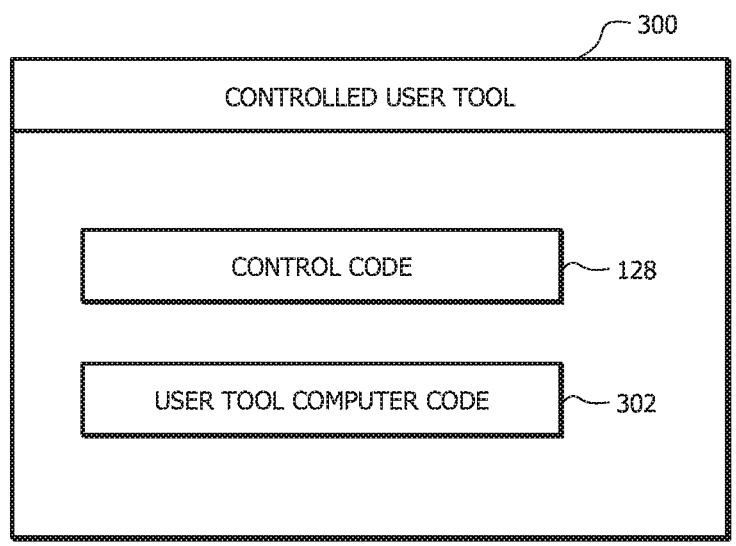
FIG. 3 illustrates an example controlled user tool, according to certain embodiments of the present disclosure.

FIG. 3 illustrates an example controlled user tool 300, according to certain embodiments of the present disclosure. Controlled user tool 300 is a user tool 114 to which control code 128 has been added to implement the common control layer. For example, controlled user tool 300 may include a user tool 114 to which control enforcement module 120 (e.g., via control enforcement insertion module 124) has added control code 128. In the illustrated example, controlled user tool 300 includes control code 128 and user tool computer code 302. FIG. 3 illustrates just one example implementation of a controlled user tool. The present disclosure contemplates controlled user tool 300 being implemented in any suitable manner. Additionally, although controlled user tool 300 is illustrated and described as including particular elements performing particular operations, the present disclosure contemplates controlled user tool 300 including some, none, or all of the illustrated elements, as well as including other elements performing suitable operations.

As described above, control code 128 implements the common control layer for user tool 114. Control enforcement module 120 may add control code 128 to a user tool 114 to implement the common control layer for the user tool 114. Control code 128 may be written in any suitable computer programming language. As just a few examples, control code 128 may be written using VBA, M Files, SAS scripts, QV scripts, and other languages. The language in which the control code 128 of controlled user tool 300 is written is compatible with the computer programming language in which user tool 114 is written. In certain embodiments, the language in which the control code 128 of controlled user tool 300 is written is the same as, or a language designed to work with, the computer programming language in which user tool 114 is written. For example, the language in which the control code 128 of controlled user tool 300 is written is the same as, or a language designed to work with, the computer programming language of user tool computer code 302 (described below). This may allow control code 128 to be automatically added to the user tool 114 to implement the common control layer with minimal or no manual intervention.

User tool computer code 302 is the computer code that implements the primary operations of the user tool 114. For example, user tool computer code 302 may be the computer code used by a user of a user computer system 102 to create the user tool 114. As just a few examples, user tool computer code 302 may be written using a scripting language, such as VBA, M Files, SAS scripts, QV scripts, and other languages. The primary operations of the user tool 114 may include the functions for which the creator of the user tool 114 created the user tool 114 to perform.

In embodiments in which user tools 114 are script programs, automatically modifying, to create controlled user tool 300, the computer code 302 of a user tool 114 to add the control code 128 to the computer code 302 of the user tool 114 comprises adding the control code 128 to the script program of the user tool 114. In certain embodiments, adding control code 128 to the script program of the user tool 114 comprises adding control code 128 to the script program of the user tool 114 such that, when the user tool 114 is launched for use (e.g. by a user of user computer system 102), control code 128 executes before the primary operations of the script program of the user tool 128. This may help ensure that the common control layer operations are complied with before the user uses the user tool 114. As a particular example, executing the access control operations implemented by access control module 202*c* of control code 128 may help ensure that a user who is not authorized to use the user tool 114 is denied access to using the user tool 114. As another particular example, executing the version control operations implemented by version control module 202*d* of control code 128 may help ensure that a user is using a current version of the controlled user tool 300.

Figure 4:
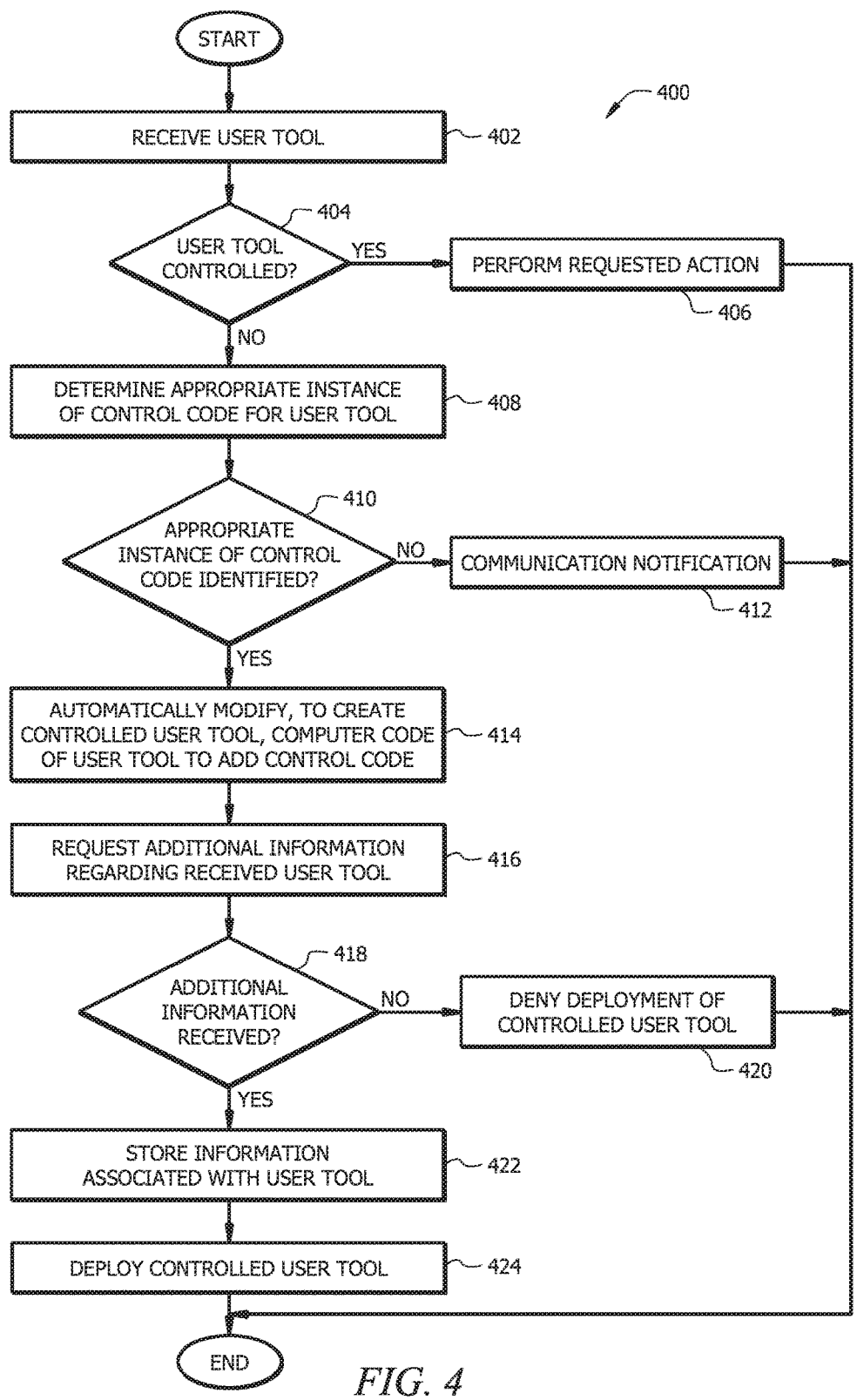
FIG. 4 illustrates an example method for modifying user tools to include control code for implementing a common control layer, according to certain embodiments of the present disclosure.

FIG. 4 illustrates an example method 400 for modifying user tools 114 to include control code 128 for implementing a common control layer, according to certain embodiments of the present disclosure. Method 400 may be implemented in any suitable combination of software, firmware, and hardware, according to particular needs. Although particular components are identified as performing particular steps, the present disclosure contemplates any suitable components performing the steps, according to particular implementations.

At step 402, control enforcement module 120 receives, via a communication network (e.g., network 110) a user tool 114. The user tool 114 may be submitted to control enforcement module 114 by a user of a user computer system 102. For example, the user may submit the user tool 114 via a user interface generated by user interface module 122 of control enforcement module. Alternatively, control enforcement module 120 may use a network crawler to discover the user tool 114. The present disclosure contemplates control enforcement module 120 discovering user tools 114 in any suitable manner.

At step 404, control enforcement module 120 determines whether the received user tool 114 is a controlled user tool 300. In certain embodiments, a controlled user tool 300 includes a user tool 114 that has been modified to include control code 128, such that the common control layer is implemented for the user tool 114. A controlled user tool 300 may be considered to be registered with control enforcement module 120. In certain embodiments, a non-controlled user tool includes a user tool 114 that has not been modified to include control code 128. To determine whether the received user tool 114 is a controlled user tool 300, control enforcement module 120 may access user tool inventory 126 stored on storage module 108 to determine whether a controlled version 300 of user tool 114 exists.

If control enforcement module 120 determines at step 404 that the received user tool 114 is a controlled user tool 300, then at step 406 control enforcement module 120 performs a requested action for the received user tool 114. For example, the user that submitted the user tool 114 may request that an action be performed on the user tool 114. As one particular example, the action may include storing an updated version of the user tool 114. Method 400 may then end.

If control enforcement module 120 determines at step 404 that the received user tool 114 is not a controlled user tool 300 (i.e., the user tool 114 is a non-controlled user tool 114), then at step 408 control code insertion module 124 of control enforcement module 120 determines an appropriate instance of control code 128 with which to modify the user tool 114 to generate a controlled user tool 300. In certain embodiments, to determine an appropriate instance of control code 128 with which to modify the user tool 114, control code insertion module 124 accesses control code mapping 130 stored on storage module 108. As described above, control code mapping 130 provides a mapping of instances of control code 128 to particular programming languages. Control code insertion module 124 may analyze the received user tool 114 to determine the programming language of the user tool 114, and may search control code mapping 130 to determine an appropriate control code 128 for modifying the computer code of the user tool 114 to create a controlled user tool 300 for the user tool 114.

At step 410, control code insertion module 124 determines whether an appropriate control code 128 for modification of the received user tool 114 was identified at step 408. If control code insertion module 124 determines that an appropriate control code 128 for modification of the received user tool 114 was not identified at step 408, then at step 412, control code enforcement module 120 communicates a notification. The notification may indicate that no control code 128 for modifying the received user tool 114 to create a controlled user tool 300 was found. The notification may be sent to any suitable combination of the user who submitted the user tool 114 (if applicable), an appropriate IT professional, a line-of-business manager for the line of business associated with the user tool 114, or any other suitable destinations. The notification may prompt the IT professional to initiate creation of control code 128 that is compatible with the received user tool 114. Method 400 may then end. Additionally or alternatively, method 400 may return to step 408 once a version of control code 128 that is compatible with the received user tool 114 has been created and added to storage module 108.

If control code insertion module 124 determines that an appropriate control code 128 for modification of the received user tool 114 was identified at step 408, then at step 414 control code insertion module 124 automatically modifies, to create a controlled user tool 300 for the user tool 114, the computer code (e.g., user tool computer code 302) of the user tool 114 to add the control code 128 to the computer code (e.g., user tool computer code 302) of the user tool 114. As described above, the control code 128 implements a common control layer, which may provide a number of control modules 202 across user tools 114 of the organization. In certain embodiments, the control modules 202 of control code 128 include one or more of inventory control module 202a, risk classification control module 202b, access control module 202c, version control module 202d, change control module 202e, document control module 202f, backup and resiliency control module 202g, data analytics control module 202h, user tool integrity control module 202i, and user tool policy and procedure management control module 202j.

In embodiments in which the user tool 114 is a script program, automatically modifying, to create the controlled user tool 300 for the user tool 114, the computer code (e.g., user tool computer code 302) of the user tool 114 to add the control code 128 to the computer code (e.g., user tool computer code 302) of the user tool 114 may be performed by adding the control code 128 to the script program of the user tool 114. In certain embodiments, control code insertion module 124 adds the control code 128 to the user tool 114 (whether a script program or other type of user tool) such that, when the user tool 114 is launched for use (e.g., by a user of a user computer system 102), the control code 128 executes before the primary operations of the user tool 114.

At step 416, control enforcement module 120 requests additional information regarding the received user tool 114. For example, control enforcement module 120 may submit request for information to various individuals associated with the received user tool 114. The individuals may include, for example, the user who submitted the user tool 114, a line-of-business manager for the line of business associated with the user tool 114, and any other suitable individuals. The request for information may include a request for documents associated with the user tool 114, a request for appropriate authorizations associated with the user tool 114, a request to complete a user tool profile 130 for the user tool 114, and any other suitable information.

At step 418, control enforcement module 120 determines whether the requested additional information has been received. If control enforcement module 120 determines at step 418 that the requested additional information has not been received, then at step 420, control enforcement engine may deny deployment of the controlled user tool 300 and method 400 may end. Additionally or alternatively, the received user tool 114 (and associated controlled user tool 300) may remain in a pending state until the requested information is received. In this scenario, upon receipt of the requested information, method 400 may proceed to step 422. If control enforcement module 120 determines at step 418 that the requested additional information has been received, then at step 422, control enforcement engine 120 stores information associated with the user tool 114. For example, control enforcement engine 120 may store a copy of the non-controlled user tool 114, a copy of controlled user tool 300 for the user tool 114, information suitable for completing a user tool profile 130 for the user tool 14 (and controlled user tool 300 for the user tool 114), a copy of some or all of the information received in response to the information request of step 416, and any other suitable information.

At step 424, control code insertion module 124 deploys the controlled user tool 300 for the user tool 114 for use in the computing environment in a manner controlled by the control code 128 of the controlled user tool 300 for the user tool 114. Control code insertion module 124 may deploy the controlled user tool 300 for the user tool 114 in any suitable manner. For example, control code insertion module 124 may push a copy of the controlled user tool 300 to user computer systems 102 associated with appropriate users. As another example, control code insertion module 124 may communicate to appropriate users a link to a location from which the controlled user tool 300 for the user tool 114 can be downloaded. Method 400 may then end.

Modifications, additions, or omissions may be made to method 400 depicted in FIG. 4. The method may include more, fewer, or other steps. Additionally, steps may be performed serially or in parallel, and in any suitable order. While certain components are described as performing particular steps, the present disclosure contemplates other components of system 100 or other components performing one or more steps of the method.

Figure 5:
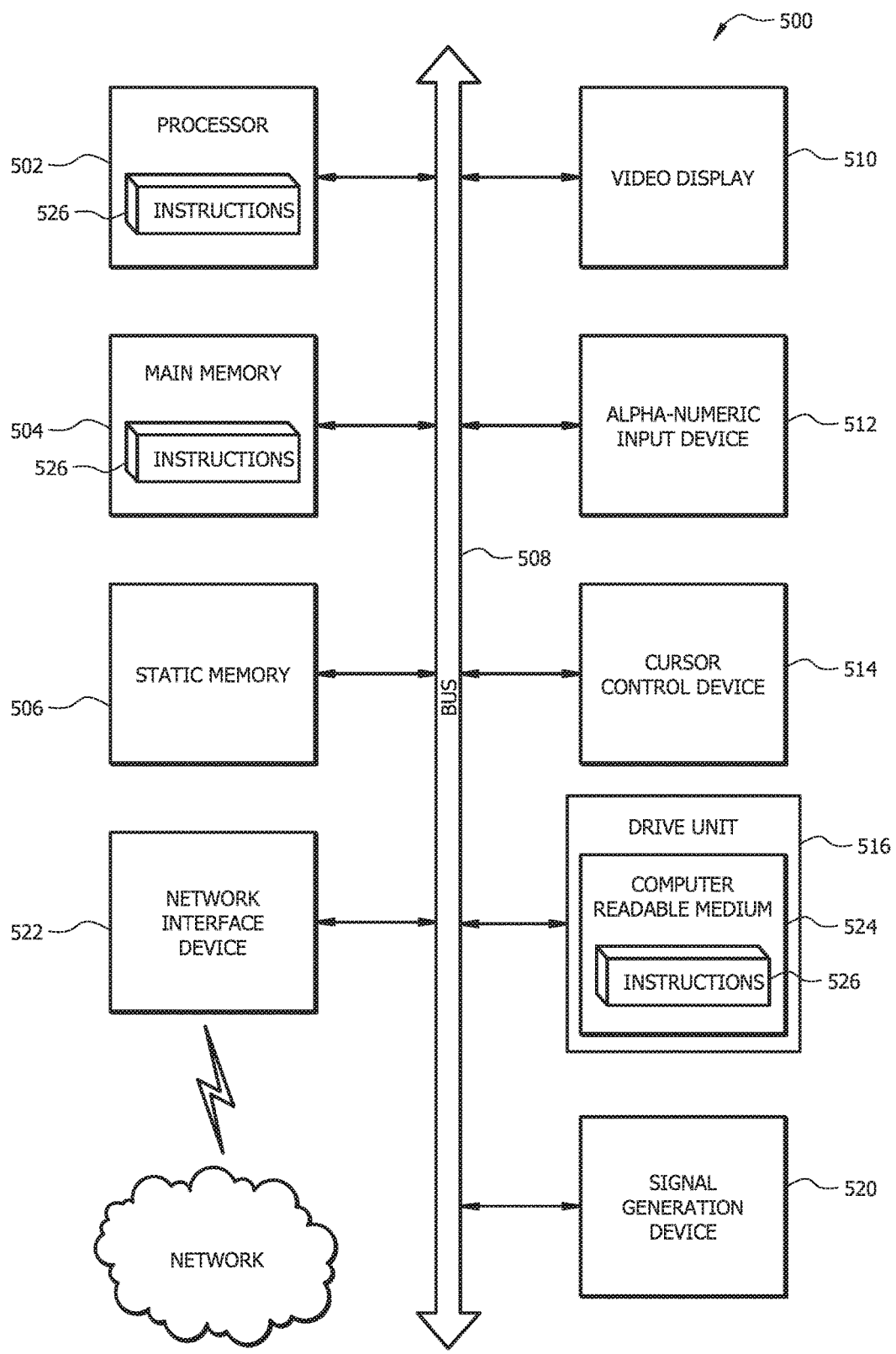
FIG. 5 illustrates a computer system within which a set of instructions, for causing the machine to perform any one or more of the methodologies described herein, may be executed, according to certain embodiments of the present disclosure.

FIG. 5 illustrates a computer system within which a set of instructions, for causing the machine to perform any one or more of the methodologies described herein, may be executed, according to certain embodiments of the present disclosure. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies described herein.

The example computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps described herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Certain embodiments of the present disclosure may provide one or more technical advantages. In certain embodiments, this solution provides a consistent implementation of controls across user tools 114 of an organization. Certain embodiments centralize substantiation and testing of controls used for user tools 114. Because the controls may be added to user tools 114 in a consistent and centralized manner, certain embodiments reduce or eliminate a task of individually checking each user tool 114 to manually confirm that appropriate controls are included in the user tool 114. Certain embodiments provide centralized auditing capabilities, possibly by logging activities of user tools and providing associate reporting, to audit the status of user tools 114 and compliance with the appropriate controls. Another technical advantage of certain embodiments is the provision of an automated solution that automatically introduces a common control layer across user tools 114 of an organization, and that automatically implements the controls provides by the common control layer. Certain embodiments are compatible with a variety of control approaches, including potentially shared folders.

Among other technical benefits, any combination of the above and other potential advantages may save the organization, and particularly the line of business associated with the user tool 114, time and costs in implementing appropriate controls for user tools 114. Furthermore, another technical advantage of certain embodiments is improving the operation of applications and devices users of the organization may use by improving compatibility and consistency of operation of implemented user tools 114 with those applications and devices.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications fall within the scope of the appended claims.

What is claimed is:

1. A system, comprising: one or more processing systems, user computer systems, application server systems or storage modules, the system comprising memory comprising programmed instructions stored thereon and one or more processors configured to be capable of executing the stored programmed instructions to:

receive a user tool of a plurality of user tools, the plurality of user tools each comprising a script program;

determine when the received user tool is previously modified to include one or more control codes;

identify at least one of the one or more control codes to be inserted in the user tool based on analyzing the script program of the user tool, when the determination indicates that the received user tool is not previously modified to include one or more control codes;

automatically modify, the script program of the user tool by inserting the at least one of the identified control code in the script program of the user tool to create a controlled user tool; and deploy the created controlled user tool in a computing environment.

2. The system of claim 1, wherein the one or more processors are further configured to be capable of executing the stored programmed instructions to:

backup data associated with the user tool; and analyzing use by end users of the user tool to identify usage patterns.

3. The system of claim 1, wherein the one or more processors are further configured to be capable of executing the stored programmed instructions to:

rate the user tools based a risk classification analysis;

verifying integrity of the user tool at periodic intervals;

review one or more policies or procedures associated with the user tool; and approve the one or more policies or procedures associated with the user tool based on the review.

4. The system of claim 1, wherein the one or more processors are further configured to be capable of executing the stored programmed instructions to:

facilitate maintaining documentation for the plurality of user tools.

5. The system of claim 1, wherein the one or more processors are further configured to be capable of executing the stored programmed instructions to:

determine when a user is an authorized user to access the user tool; and allow the user access to the user tool when the determination indicates that the user is an authorized user.

6. The system of claim 1, wherein the one or more processors are further configured to be capable of executing the stored programmed instructions to:

determine, in response to receiving, via a communication network, the particular user tool, when a programming language of the script program of the user tool is compatible with the at least one of the identified control code; and automatically modify, the script program of the user tool to add the at least one of the identified control code when the determination indicates that the determined programming language of the script program of the user tool is compatible with the at least one of the identified control code.

7. A non-transitory computer-readable medium having stored thereon instructions for modifying user tools for implementing a common control layer comprising executable code which when executed by one or more processors, causes the one or more processors to:

receive a user tool of a plurality of user tools, the plurality of user tools each comprising a script program;

determine when the received user tool is previously modified to include one or more control codes;

identify at least one of the one or more control codes to be inserted in the user tool based on analyzing the script program of the user tool, when the determination indicates that the received user tool is not previously modified to include one or more control codes;

automatically modify, the script program of the user tool by inserting the at least one of the identified control code in the script program of the user tool to create a controlled user tool and;

deploy the created controlled user tool in a computing environment.

8. The non-transitory computer-readable medium of claim 7, wherein the executable code when executed by the one or more processors further causes the one or more processors to:

backup data associated with the user tool; and analyzing use by end users of the user tool to identify usage patterns.

9. The non-transitory computer-readable medium of claim 7, wherein the executable code when executed by the one or more processors further causes the one or more processors to:

rate the user tools based a risk classification analysis;

verifying integrity of the user tool at periodic intervals;

review one or more policies or procedures associated with the user tool; and approve the one or more policies or procedures associated with the user tool based on the review.

10. The non-transitory computer-readable medium of claim 7, executable code when executed by the one or more processors further causes the one or more processors to:

facilitate maintenance of documentation for the plurality of user tools.

11. The non-transitory computer-readable medium of claim 7, wherein the executable code when executed by the one or more processors further causes the one or more processors to:

determining when a user is an authorized user to access the user tool; and allowing the user access to the user tool when the determination indicates that the user is an authorized user.

12. The non-transitory computer-readable medium of claim 7, wherein the executable code when executed by the one or more processors further causes the one or more processors to:

determine, in response to receiving, via a communication network, the user tool, when a programming language of the script program of the user tool is compatible with the at least one of the identified control code; and automatically modify, the script program of the user tool to add the at least one of the identified control code when the determination indicates that the determined programming language of the script program of the user tool is compatible with the at least one of the identified control code.

13. A method comprising:

receiving a user tool of a plurality of user tools, the plurality of user tools each comprising a script program;

determining when the received user tool is previously modified to include one or more control codes;

identifying at least one of the one or more control codes to be inserted in the user tool based on analyzing the script program of the user tool, when the determination indicates that the received user tool is not previously modified to include one or more control codes;

automatically modifying the script program of the user tool by inserting the at least one of the identified control code in the script program of the user tool to create a controlled user tool and;

deploying the created controlled user tool in a computing environment.

14. The method of claim 13, further comprising:

determining, in response to receiving, via a communication network, the user tool, when a programming language of the script program of the user tool is compatible with the at least one of the identified control code; and automatically modify, the script program of the user tool to add the at least one of the identified control code when the determination indicates that the determined programming language of the script program of the user tool is compatible with the at least one of the identified control code.

15. The method of claim 13, further comprising:
backing-up data associated with the user tool; and
analyzing use by end users of the user tool to identify usage patterns.

16. The method of claim 13, further comprising:
rating the user tools based a risk classification analysis;
verifying integrity of the user tool at periodic intervals;
reviewing one or more policies or procedures associated with the user tool; and
approving the one or more policies or procedures associated with the user tool based on the review.

17. The method of claim 13, further comprising: facilitating maintenance of documentation for the plurality of user tools.

18. The method of claim 13, further comprising:
determining when a user is an authorized user to access the user tool; and
allowing the user access to the user tool when the determination indicates that the user is an authorized user.

* * * * *